US005867750A

United States Patent [19]

Do

[11] Patent Number: 5,867,750

[45] Date of Patent: Feb. 2, 1999

[54] DEVICE FOR ADJUSTING TONER CONCENTRATION OF PRINTED IMAGE IN AN IMAGE FORMING APPARATUS USING ELECTROPHOTOGRAPHIC DEVELOPING PROCESS

[75] Inventor: Ki-Jae Do, Suwon, Rep. of Korea

[73] Assignee: SamSung Electronics Co., Ltd., Kyungki-do, Rep. of Korea

[21] Appl. No.: 882,600

[22] Filed: Jun. 25, 1997

[30] Foreign Application Priority Data

Jun. 25, 1996 [KR] Rep. of Korea ...................... 96-23615

[51] Int. Cl.[6] .................................................... G03B 15/08

[52] U.S. Cl. ................................ 399/55; 399/53; 399/270

[58] Field of Search .................................. 399/46, 53, 55, 399/56, 270, 285

[56] References Cited

U.S. PATENT DOCUMENTS 5,072,258 12/1991 Harada .
5,164,779 11/1992 Araya et al. .
5,247,328 9/1993 Daunton et al. .
5,287,149 2/1994 Hoshika .
5,349,421 9/1994 Kishimoto et al. ........................ 399/46
5,424,809 6/1995 Sawayama et al. .
5,479,243 12/1995 Kurosawa et al. .
5,517,289 5/1996 Ito et al. .
5,534,982 7/1996 Sakaizawa et al. .

*Primary Examiner*—Richard Moses
*Attorney, Agent, or Firm*—Robert E. Bushnell, Esq.

[57] ABSTRACT

A method for achieving adjusted toner concentration of printed image on a recording medium in an image forming apparatus using an electrophotographic developing process including a photosensitive drum for forming a latent image on its negatively charged photoconductive insulating surface exposed to light according to an image pattern and a developing roller charged with a negative developing voltage to charge by rubbing a toner supplied from a toner supplier with a negative voltage. The method includes the steps of keeping constant the background voltage of remaining portion of the photoconductive insulating surface except for the latent image portion, and changing the voltage of the latent image portion of the photoconductive insulating surface so as to adjust the amount of toner particles attracted to the latent image portion for forming an enhanced printed image on the recording medium without contamination in the background thereof

20 Claims, 4 Drawing Sheets

DEVICE FOR ADJUSTING TONER CONCENTRATION OF PRINTED IMAGE IN AN IMAGE FORMING APPARATUS USING ELECTROPHOTOGRAPHIC DEVELOPING PROCESS

CLAIM OF PRIORITY

This application makes reference to, incorporates the same herein, and claims all benefits accruing under 35 U.S.C. §119 from an application for DEVICE FOR ACHIEVING ANADJUSTED TONER CONCENTRATION OF PRINTED IMAGE IN AN ELECTROPHOTOGRAPHIC APPARA TUSAAD METHOD THEREFOR earlier filed in the Korean Industrial Property Office on the 25$^{th}$ day of Jun. 1996 and there duly assigned Ser. No. 23615/1996, a copy of which application is annexed hereto.

BACKGROUND OF THE INVENTION

1. Field of the Invention

The present invention generally relates to an image forming apparatus using an electrophotographic developing process such as a laser beam printer, copier and facsimile machine, and more particularly, relates to a device for obtaining adjusted toner concentration of printed image in such an image forming apparatus.

2. Related Art

Electrophotographic developing process is widely used in computer printers, facsimile machines and photocopiers in order to produce images on recording media in response to video signals. A common example of an electrophotographic printing apparatus is a laser beam printer which prints images on individual sheet of paper through a series of electrostatic image-forming steps. Typically, the process of electrostatic image forming includes charging a photosensitive drum to a substantially uniform potential so as to sensitize the surface thereof. The charged portion of the photosensitive drum is exposed to a light image of an original document being reproduced. This creates an electrostatic latent image corresponding to the document image on the photosensitive drum. After the electrostatic latent image is formed on the photosensitive drum, the latent image is developed by applying toner from a developing unit into contact with the latent image formed on the photosensitive drum. This forms a toner image of the original document on the photosensitive drum which is subsequently transferred and fixed on a recording medium. When a toner image is fixed on a recording medium, the toner image is first heated and fused onto the recording medium, and then naturally cooled so that it is fixed onto the recording medium.

Generally, as a unit for charging the surface of the photosensitive drum, a contact-type charging roller such as disclosed, for example, in U.S. Pat. No. 5,517,289 for *Apparatus for And Method Of Forming Image* issued to Ito et al., U.S. Pat. No. 5,479,243 for *Image Forming Apparatus And Charging Device Thereof* issued to Kurokawa, U.S. Pat. No. 5,247,328 for *Method And Apparatus For Charging A Photoconductive Surface To A Uniform Potential* issued to Daunton et al., and U.S. Pat. No. 5,164,779 for *Image Forming Apparatus With Dual Voltage Supplies For Selectively Charging And Discharging An Image Bearing Member* issued to Araya et al., using a so-called contact (or direct) charging scheme to produce an uniform electric field in response to application of high voltage for charging the surface of the photosensitive drum to a constant potential to attract toner particles and thereby form the latent image on the photosensitive drum. Typically, a charging unit is charged at the start of a printing operation. The surface of the photosensitive drum is charged and a developing unit is concurrently charged by way of the charging unit as the photosensitive drum rotates in a direction opposite to the rotation of the developing unit. The surface potential of a photosensitive drum is controlled by a number of known techniques as described, for example, in U.S. Pat. No. 5,072,258 for *Method Of Controlling Surface Potential Of Photoconductive Element* issued to Harada, U.S. Pat. No. 5,287,149 for *Image Forming Apparatus Having Image Transfer Electrode Contactable To Transfer Material* issued to Hoshika, and U.S. Pat. No. 5,534,982 for *Developing Apparatus* issued to Sakaizawa et al., in which the surface of the photosensitive drum is charged differently depending upon an image density and its background.

As a result, an electrostatic latent image is formed on the photosensitive drum and the latent image is then visualized as a toner image by the developing unit. The charged area of the photosensitive drum is then exposed to a laser beam. Because of the potential difference between the exposed portion and the unexposed portion of the photosensitive drum, the toner particles are attracted only to the exposed portion to form the toner image on the photosensitive drum, and its density may be adjusted without causing contamination to occur in the unexposed portion of the photosensitive drum as disclosed, for example, in U.S. Pat. No. 5,424,809 for *Image Forming Method And Apparatus For The Same* issued to Sawayama et al. After the toner image formed on the photosensitive drum is transferred to the recording medium, the photosensitive drum is charged back to an original voltage as the recording medium is being conveyed to a fixing unit. When the toner image is fixed on the recording medium by the fixing unit, the photosensitive drum is charged to a reference voltage. The residual toner on the surface of the photosensitive drum is subsequently cleaned by a cleaning blade of a cleaning device and is finally collected as waste toner. While contemporary surface potential controlling techniques contain their own merits, it is my observation that none can effectively eliminate unwarranted attraction of abnormal toner particles to the unexposed portion of the photosensitive drum which causes contamination to occur in the background of printed image on a recording medium.

SUMMARY OF THE INVENTION

Accordingly, it is therefore an object of the present invention to provide an improved image forming apparatus using an electrophotographic developing process for efficiently controlling a surface potential of a photosensitive drum to ensure high quality image development.

It is also an object to provide an improved image forming apparatus having a device incorporated therein for effectively adjusting toner concentration of printed image while concomitantly eliminating toner contamination in the background of printed image on a recording medium.

These and other objects of the present invention can be achieved by an image forming apparatus using an electrophotographic developing process which includes a photosensitive drum; a developing unit charged with a constant developing voltage, for applying toner particles onto a latent image portion of the photosensitive drum corresponding to an image pattern to develop a latent image electrostatically formed on the latent image portion of the photosensitive drum; a ground voltage selector electrically connected to the photosensitive drum, for applying one of differently preset ground voltages to the photosensitive drum to control adjustment of amount of toner particles attracted to the latent image portion of the photosensitive drum corresponding to the image pattern; and a controller for controlling the ground voltage selector to apply one of the differently preset ground voltages to the photosensitive drum according to a selected toner concentration so as to adjust the amount of the toner particles attracted by the latent image portion of the photosensitive drum. The ground voltage selector includes a plurality of Zener diodes connected in series between the photosensitive drum and ground, and a plurality of switches for selectively connecting the Zener diodes between the photosensitive drum and ground under control of the controller.

The present invention will now be described with reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
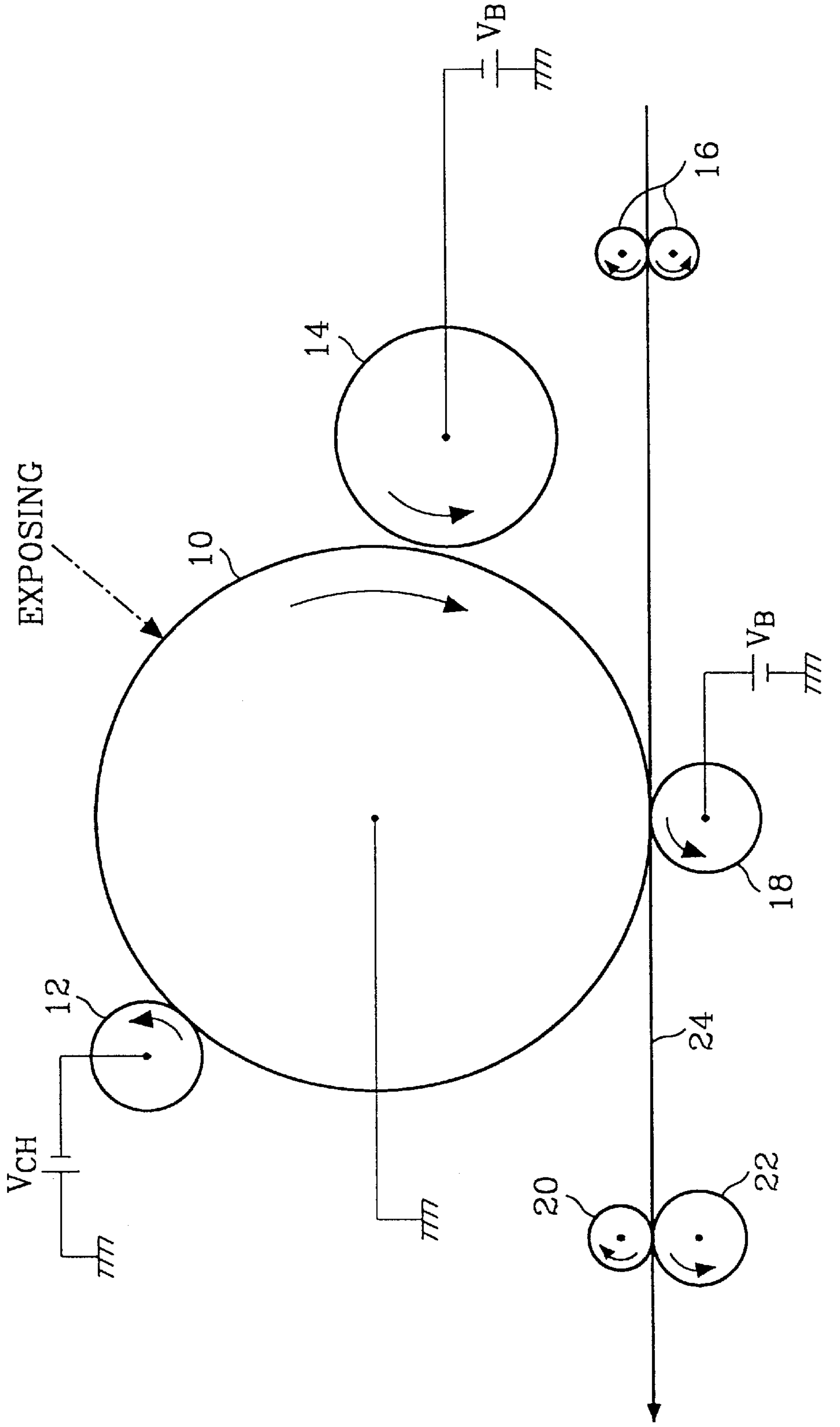
FIG. 1 illustrates a typical engine mechanism of an image forming apparatus using an electrophotographic developing process.

Referring now to the drawings and particularly to FIG. 1, which illustrates a typical engine mechanism of an image forming apparatus using an electrophotographic developing process. As shown in FIG. 1, the engine mechanism includes a photosensitive drum 10, a charging roller 12, a developing roller 14, register rollers 16, a transfer roller 18, and a fixing unit comprising a pressure roller 20 and a heat roller 22. These rollers are rotated by an engine drive motor (not shown) in directions indicated by arrows as shown in FIG. 1. A sheet of paper is first supplied from a paper supply cassette (not shown), then conveyed along a conveyance path 24, and is finally discharged via pressure roller 20 and heater roller 22.

The surface of the photosensitive drum 10 is uniformly charged with a negative charging voltage Vch by the charging roller 12. Thereafter, an exposing unit (not shown) exposes the surface portions of the photosensitive drum 10 corresponding to an image pattern to form an electrostatic latent image. The exposed portions undergo potential increase but the other portions remain unchanged so as to produce a potential difference which forms the latent image.

The exposing unit may be a laser scanner unit (LSU) in a laser beam printer or a document scanner unit in an electrophotographic copying machine. The leading edge of a sheet of paper is first aligned at register roller 16, and is then conveyed to the transfer roller 18 when light exposure is started.

The electrostatic latent image formed on the photosensitive drum 10 is visibly developed by a developing agent such as the toner on the developing roller 14. The developing roller 14 is charged with a negative developing voltage VB. The developing agent supplied by a developing agent supplier (not shown) is rubbed along the surface of the developing roller 14 so as to be charged with the negative developing voltage VB, transferred to developing zone as the developing roller 14 rotates. Developing zone represents the location where the developing agent on the developing roller 14 is transferred and attached to the electrostatic latent image formed on the photosensitive drum 10. The developing agent attached to the latent image of the photosensitive drum 10 is finally transferred to a recording medium by a transfer roller 18. The developing agent is fixed onto the recording medium by the pressure and heat of the fixing unit consisting of the pressure roller 20 and heat roller 22. After the image is permanently fixed on the recording medium, the recording medium is discharged, via discharge rollers (not shown) to the outside of the image forming apparatus.

Such an image forming apparatus is usually provided with a device for selectively adjusting concentration or toner density of a printed image. Typically, voltages (hereinafter referred to as "exposed voltage") VL of the exposed portion of the photosensitive drum 10 exhibit negative values smaller than the developing voltage VB, so that the negatively charged developing agent on the developing roller 14 is transferred to the exposed portion of the photosensitive drum 10. In this situation, supposing the distance between the surface of the photosensitive drum 10 and the latent image on the developing roller 14 is "d", the negative charge amount of the developing agent "q" and the developing electric field formed between the latent image and the developing roller 14 "E", the force "F" applied to the negative charge amount "q" by the developing electric field is expressed by Equation #1 as follows.

$$F = q \times E \quad \text{(Eq. 1)}$$

In Equation #1, the electric field may be expressed by $\Delta V/d$, wherein $\Delta V$ is the potential difference between the exposed voltage VL and the developing voltage VB. Accordingly, Eq. 1 may be rewritten as Equation #2 as follows.

$$F = q \times (VL - VB)/d \quad \text{(Eq. 2)}$$

As shown by Eqs. 1 and 2, the force "F" is in proportion to the electric field "E", which is also in proportion to the potential difference between the exposed voltage VL and the developing voltage VB. Hence, as the developing voltage VB is changed, the force "F" is changed to vary the amount of the developing agent transferred from the developing roller 14 to the photosensitive drum 10. Namely, as the developing voltage VB is negatively increased, the amount of the developing agent transferred to the photosensitive drum 10 is also increased to thicken the toner image concentration.

Figure 2:
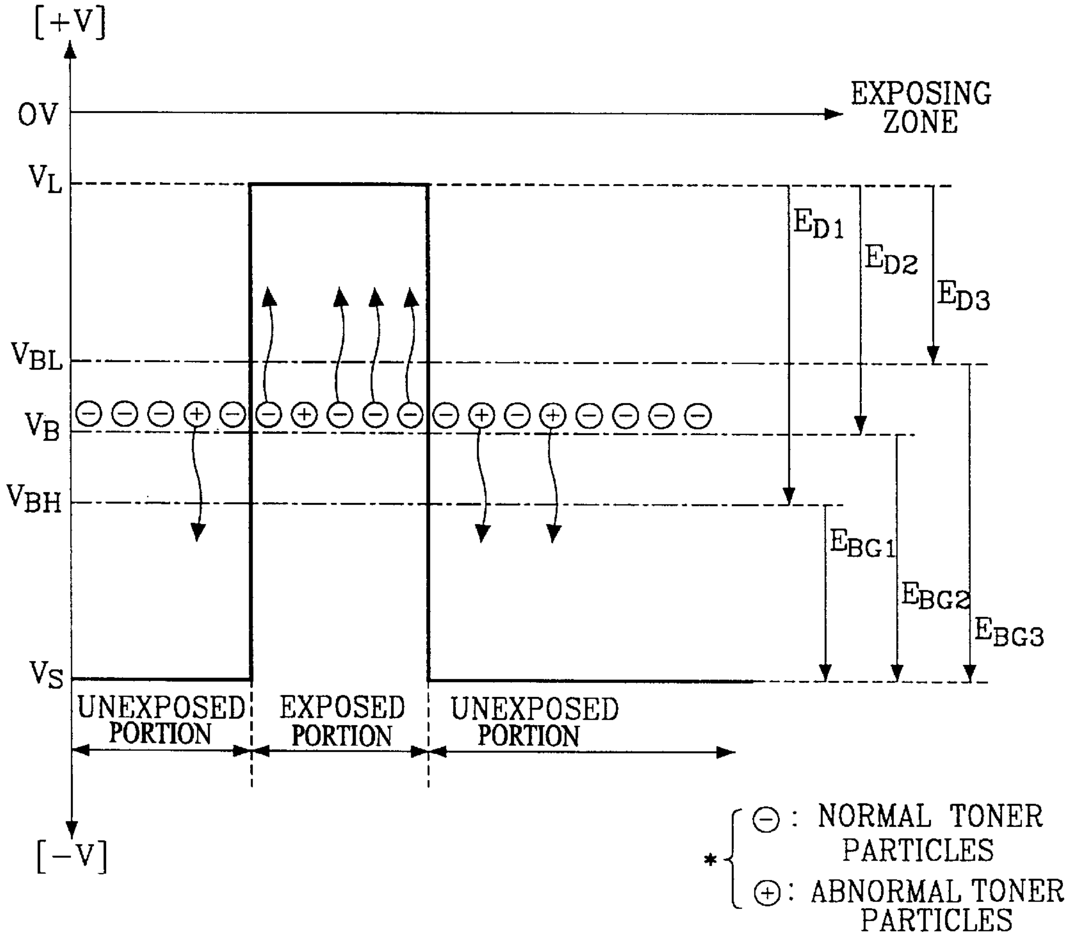
FIG. 2 is a timing diagram of potential differences between mechanical components of the engine mechanism of FIG. 1 while performing various adjustments of toner image in an image forming apparatus.

Meanwhile, there exist partly on the developing roller 14 positively charged particles of developing agent (hereinafter referred to as "abnormal toner particles") together with the negatively charged particles of developing agent (hereinafter referred to as "normal toner particles"). The abnormal toner particles are produced by abnormal rubbing along the surface of the developing roller 14, and may be attracted by the unexposed portion of the photosensitive drum 10. In particular, if the developing voltage VB is adjusted to exhibit a negatively lower value, the abnormal toner particles are more easily attracted by the unexposed portion of the photosensitive drum. This is because the potential difference between the developing voltage VB and the voltage of the abnormal toner particles is reduced to induce the abnormal toner particles to easily attract to the unexposed portion of the photosensitive drum. Namely, the electrical force of the developing roller 14 for attracting the abnormal toner particles is weakened so as to make the abnormal toner particles attracted by the unexposed portion of the photosensitive drum 10 more negatively charged than the developing roller. This phenomenon is described more specifically as follows:

Refer now to FIG. 2 which is a timing diagram of potential differences between mechanical components the engine mechanism of an image forming apparatus as shown in FIG. 1. As shown in FIG. 2, 0V represents a ground voltage, VL represents an exposed voltage of the photosensitive drum 10, Vs the unexposed voltage, and VBL and VBH respectively the maximum and the minimum value of the adjustment range of the developing voltage VB. ED1–ED3 represent the developing electric fields to make the normal toner particles be attracted by the latent image on the photosensitive drum while EBG1–EBG3 represent the background electric fields formed between the developing roller 14 and the unexposed portion of the photosensitive drum 10. In the drawing, small "–" circle represents the normal toner particles, and small "+" circle the abnormal toner particles.

Assuming that ED2 represents the developing electric field to achieve the printed image of standard tone by making the normal toner particles attracted by the latent image on the photosensitive drum 10. In this situation, the unexposed portion of the photosensitive drum 10 applies the background electric field EBG2 to attract the abnormal toner particles on the developing roller 14. In this state, if the developing voltage VB is adjusted to VBL, the developing electric field strength is reduced to ED3 towards VBL resulting in a thinner image concentration. In contrast, the background electric field strength is enhanced from EBG2 to EBG3, so that the unexposed portion of the photosensitive drum 10 applies a greater attractive force to the abnormal toner particles on the developing roller 114. Because of this, if the abnormal toner particles are attached onto the unexposed portion of the photosensitive drum 10, the background of the printed image becomes stained.

Figure 3:
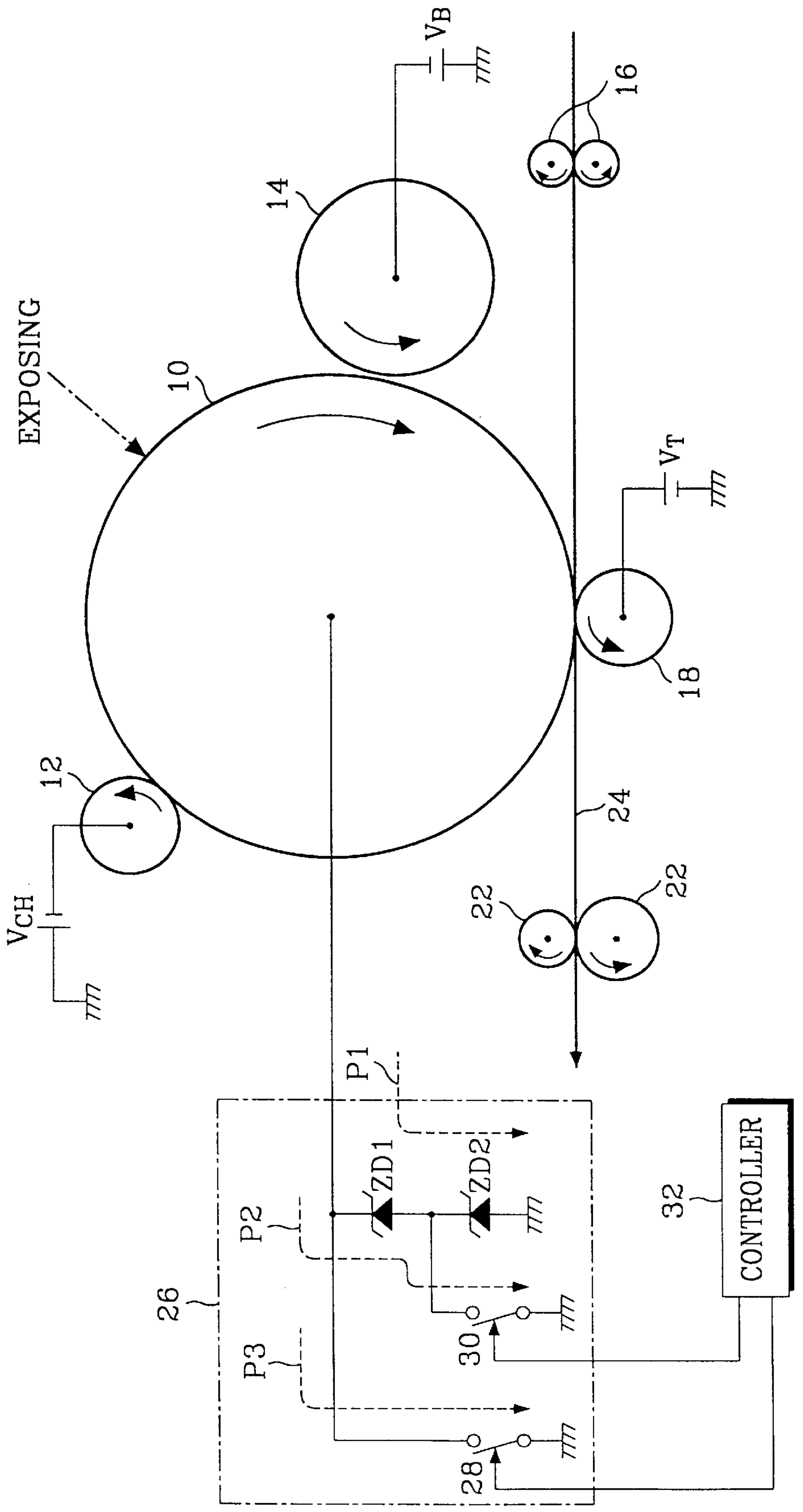
FIG. 3 illustrates an engine mechanism including a device for achieving adjusted toner concentration of printed image constructed according to the principles of the present invention.

Turning now to FIG. 3, which illustrates a ground voltage selector 26 for providing a photosensitive drum 10 with one of differently preset ground voltages in response to control of a controller 32 in order to effectively adjust toner concentration of a printed image while eliminating toner contamination in the background of printed image on a recording medium according to the principles of the present invention. As shown in FIG. 3, the engine mechanism includes similar mechanical components as that as shown in FIG. 1, such as, a photosensitive drum 10, a charging roller 12, a developing roller 14, register rollers 16, a transfer roller 18, and a fixing unit comprising a pressure roller 20 and a heat roller 22.

The ground voltage selector 26 as constructed according to the principles of the present invention comprises a first and a second Zener diode ZD1 and ZD2 and a first and a second switch 28 and 30. The first and second Zener diodes ZD1 and ZD2 are connected in series between the photoconductive drum 10 and ground. The first switch 28 is to connect the photoconductive drum 10 with ground while the second switch 30 is to connect ground with the node between the first and second Zener diodes ZD1 and ZD2. The first and second switches 28 and 30 are selectively switched by the controller 32. The controller 32 is a conventional device designed to control the ground voltage selector 26 to perform a switching operation according to a selected toner concentration. The controller 32 may be operated automatically or by the user's key input.

If both of the first and second switches 28 and 30 are turned off, the current path from the photosensitive drum 10 to ground is established through both of the first and second Zener diodes ZD1 and ZD2, which is referred to as the first path P1. Alternatively, if the first switch 28 is turned off with the second switch 30 turned on, the current path from the photosensitive drum 10 to ground is established through the first Zener diode ZD1 and the second switch 30, which is referred to as the second path P2. Finally, if both of the first and second switches 28 and 30 are turned on, or only the first switch 28 is turned on, the current path from the photosensitive drum 10 to ground is established only through the first switch 28, which is referred to as the third path P3. One of the first, second and third paths P1, P2 and P3 is selected to control the exposed voltage VL so that the developing electric field strength is changed to adjust the toner concentration of the printed image.

Figure 4:
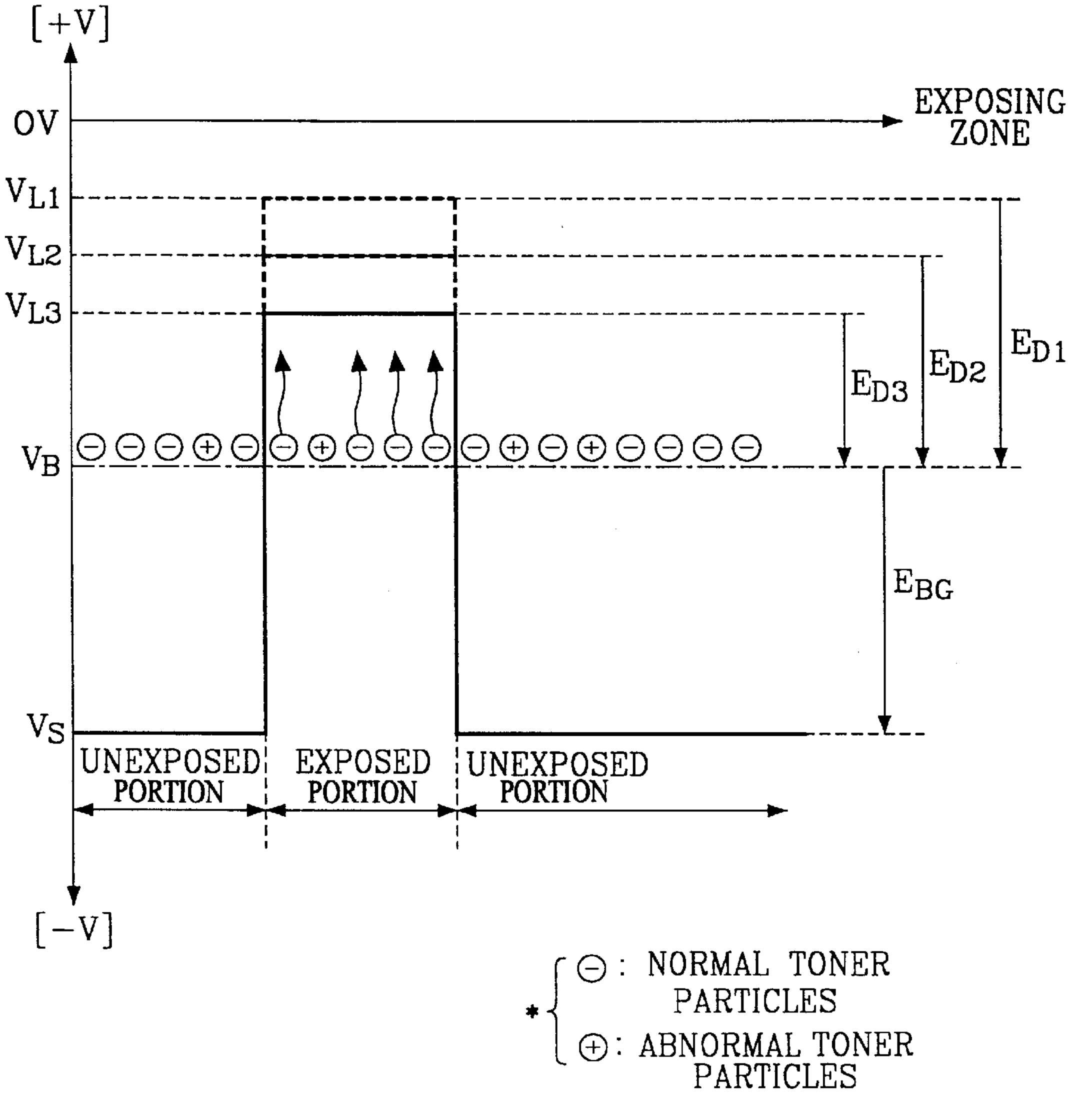
FIG. 4 is a timing diagram of potential differences between mechanical components of the engine mechanism of FIG. 3 while performing various adjustments of toner image tone in an image forming apparatus according to the principles of the present invention.

Refer now to FIG. 4 which is a timing diagram of potential differences between mechanical components of the engine mechanism as shown in FIG. 3 for adjusting the toner concentration. As shown in FIG. 4, VL1 represents the exposed voltage obtained by the first path P1, VL2 by the second path P2 and VL3 by the third path P3. Hence, the absolute values of the exposed voltages VL1, VL2, VL3 satisfy inequality of $VL1<VL2<VL3$. In addition, representing the zener voltage of the first and second zener diodes ZD1 and ZD2 by Vz, the voltage difference between VL1 and VL2 and between VL2 and VL3 is Vz.

Thus, the value of the developing electric field becomes ED1, ED2 or ED3 according to the exposed voltages VL1, VL2 and VL3 even with the developing voltage VB being a constant. In this case, it is assumed that the developing electric field of the standard concentration is ED2. If the first and second switches 28 and 30 are controlled for the exposed voltage to be VL3, the developing electric field strength ED3 is reduced against VB weakening the image concentration, as shown in FIG. 4. Alternatively, if the first and second switches 28 and 30 are controlled for the exposed voltage to be VL1, the developing electric field strength ED1 is increased against VB enhancing the image concentration.

As described above, the developing voltage VB has a constant value regardless of the adjustment of toner image concentration and therefore, the background electric field strength EBG is kept at a constant value, so that the abnormal toner particles are prevented from being attracted to unexposed portion of the photosensitive drum when performing the adjustment of the image concentration. As a result, printed image is enhanced and contamination in the background of the image is eliminated.

Although the present invention has been described in connection with the preferred embodiments, it will be apparent to those skilled in this art that various modifications may be made to them without departing the scope of the appended claims. For example, the present embodiment employs two zener diodes and two switches to adjust the exposed voltage to one of the three values, but it may be allowed to increase the number of zener diodes and switches so as to adjust the image concentration through more steps. In addition, varistors may be used instead of zener diodes in a similar manner. Further, in an electrophotographic apparatus with cleanerless system, the cleaning electric field for recovering the toner is fixed to have a constant value, thus preventing the ghost image.

What is claimed is:

1. An image forming apparatus, comprising:

a photosensitive drum;

a developing unit charged with a developing voltage, for applying toner particles onto a latent image portion of said photosensitive drum corresponding to an image pattern to develop a latent image electrostatically formed on said latent image portion of said photosensitive drum into a visible image to be transferred onto a recording medium;

a voltage selector electrically connected to said photosensitive drum, for providing one of differently preset voltages to said photosensitive drum to control adjustment of amount of toner particles attracted to said latent image portion of said photosensitive drum corresponding to said image pattern; and a controller for controlling said voltage selector to provide one of said differently preset voltages to said photosensitive drum according to a selected toner concentration so as to adjust the amount of the toner particles attracted to said latent image portion of said photosensitive drum for development of said latent image into said visible image.

2. The image forming apparatus of claim 1, further comprised of said voltage selector comprising a plurality of zener diodes connected in series between said photosensitive drum and ground, and a plurality of switches for selectively connecting said zener diodes between said photosensitive drum and said ground under control of said controller.

3. The image forming apparatus of claim 1, further comprised of said developing voltage charged to said developing unit being kept constant so as to maintain the magnitude of a background electric field formed between said developing voltage and a background voltage applied to remaining portions of said photosensitive drum except for said latent image portion.

4. The image forming apparatus of claim 1, further comprised of said voltage selector comprising a plurality of varistors connected in series between said photosensitive drum and ground and a plurality of switches for selectively connecting said varistors between said photosensitive drum and said ground under control of said controller.

5. The image forming apparatus of claim 4, further comprised of said developing voltage charged to said developing unit being kept constant so as to maintain the magnitude of a background electric field formed between said developing voltage and a background voltage applied to remaining portions of said photosensitive drum except for said latent image portion.

6. The image forming apparatus of claim 1, further comprised of said voltage selector comprising:

a first Zener diode having a cathode electrically connected to said photosensitive drum;

a second Zener diode having a cathode connected to an anode of said first Zener diode and an anode connected to a voltage terminal;

a first switch connected between said photosensitive drum and said voltage terminal, and operable in response to control of said controller; and a second switch connected between the cathode of said second Zener diode, and operable in response to control of said controller.

7. The image forming apparatus of claim 6, further comprised of said developing voltage charged to said developing unit being kept constant so as to maintain the magnitude of a background electric field formed between said developing voltage and a background voltage applied to remaining portions of said photosensitive drum except for said latent image portion.

8. An image forming apparatus, comprising:

a photosensitive drum;

means for applying an exposed voltage to said photosensitive drum to charge a latent image surface of said photosensitive drum, and for maintaining an unexposed voltage charging a non-latent image surface of said photosensitive drum at a constant level;

a developing unit charged with a developing voltage, for applying toner particles onto the latent image surface of said photosensitive drum corresponding to an image pattern to develop a latent image electrostatically formed on said latent image surface of said photosensitive drum into a visible image;

a voltage selector electrically connected to said photosensitive drum, for adjusting the exposed voltage applied to said photosensitive drum to control adjustment of amount of toner particles attracted to said latent image surface of said photosensitive drum corresponding to said image pattern; and a controller for controlling said voltage selector to adjust the exposed voltage applied to said photosensitive drum according to a selected toner concentration so as to adjust the amount of the toner particles attracted to said latent image surface of said photosensitive drum for development of said latent image into said visible image.

9. (Amended) The image forming apparatus of claim 8, further comprised of said voltage selector comprising a plurality of zener diodes connected in series between said photosensitive drum and ground, and a plurality of switches for selectively connecting said zener diodes between said photosensitive drum and said ground under control of said controller.

10. The image forming apparatus of claim 9, further comprised of said developing voltage charged to said developing unit being kept constant so as to maintain the magnitude of a background electric field formed between said developing voltage and the unexposed voltage applied to the nonlatent image surface of said photosensitive drum stable for image development.

11. The image forming apparatus of claim 8, further comprised of said voltage selector comprising a plurality of varistors connected in series between said photosensitive drum and ground and a plurality of switches for selectively connecting said varistors between said photosensitive drum and said ground under control of said controller.

12. The image forming apparatus of claim 11, further comprised of said developing voltage charged to said developing unit being kept constant so as to maintain the magnitude of a background electric field formed between said developing voltage and the unexposed voltage applied to the non-latent image surface of said photosensitive drum.

13. The image forming apparatus of claim 8, further comprised of said voltage selector comprising:

a first Zener diode having a cathode electrically connected to said photosensitive drum;

a second Zener diode having a cathode connected to an anode of said first Zener diode and an anode connected to a voltage terminal;

a first switch connected between said photosensitive drum and said voltage terminal, and operable in response to control of said controller; and a second switch connected between the cathode of said second Zener diode, and operable in response to control of said controller.

14. The image forming apparatus of claim 13, further comprised of said developing voltage charged to said developing unit being kept constant so as to maintain the magnitude of a background electric field formed between said developing voltage and the unexposed voltage applied to the non-latent image surface of said photosensitive drum stable for image development.

15. A method for achieving adjusted toner concentration of printed image on a recording medium in an electrophotographic apparatus including a photosensitive drum for forming a latent image on a latent image surface exposed to light according to an image pattern and a developing roller charged with a developing voltage to develop a latent image electrostatically formed on the photosensitive drum, said method comprising the steps of:

applying a background voltage to a non-latent image surface of said photosensitive drum, and an exposed voltage to a latent image surface of said photosensitive drum; and adjusting the exposed voltage applied to the latent image surface of said photosensitive drum, while maintaining the background voltage applied to the non-latent image surface of said photosensitive drum at a constant level so as to adjust amount of toner particles attracted to said latent image surface of said photosensitive drum for development of said latent image into said visible image.

16. The method of claim 15, further comprised of said exposed voltage applied to the latent image surface of said photosensitive drum being adjusted by grounding via different current paths.

17. An image forming apparatus, comprising:

a photosensitive drum;

a charging unit for charging a surface of said photosensitive drum with a charging voltage;

an exposure unit for exposing the surface of said photosensitive drum corresponding to an image pattern to form a latent image thereon;

a developing unit charged with a developing voltage, for applying toner particles onto the surface of said photosensitive drum corresponding to said image pattern to develop said latent image electrostatically formed on said photosensitive drum as a visible image; and means for adjusting an exposed voltage corresponding to the charging voltage remained on an exposed surface of said photosensitive drum after exposure according to a selected toner concentration so as to adjust the amount of the toner particles attracted to the surface of said photosensitive drum for development of said latent image into said visible image.

18. The image forming apparatus of claim 17, further comprised of said means for adjusting the charging voltage on an exposed surface of said photosensitive drum comprising:

a ground selector comprising a plurality of current paths connected to said photosensitive drum, for grounding said exposed voltage via one of said plurality of current paths to adjust the amount of toner particles attracted to the surface of said photosensitive drum; and a controller for controlling said ground selector to ground said exposed voltage via said one of said plurality of current paths for toner adjustment.

19. The image forming apparatus of claim 18, further comprised of said ground selector comprising a plurality of varistors connected in series between said photosensitive drum and ground and a plurality of switches for selectively connecting said varistors between said photosensitive drum and said ground under control of said controller.

20. The image forming apparatus of claim 18, further comprised of said ground selector comprising:

a first Zener diode having a cathode electrically connected to said photosensitive drum;

a second Zener diode having a cathode connected to an anode of said first Zener diode and an anode connected to a voltage terminal;

a first switch connected between said photosensitive drum and said voltage terminal, and operable in response to control of said controller; and a second switch connected between the cathode of said second Zener diode, and operable in response to control of said controller.

* * * * *